United States Patent [19]
Crespi et al.

[11] Patent Number: 5,766,797
[45] Date of Patent: Jun. 16, 1998

[54] ELECTROLYTE FOR LI/SVO BATTERIES

[75] Inventors: Ann M. Crespi, Minneapolis; Kevin Chen, New Brighton, both of Minn.

[73] Assignee: Medtronic, Inc., Minneapolis, Minn.

[21] Appl. No.: 757,220

[22] Filed: Nov. 27, 1996

[51] Int. Cl.$^6$ .................................................. H01M 6/14
[52] U.S. Cl. .............................................. 429/197; 429/219
[58] Field of Search .................................... 429/194, 196, 429/197, 218, 219

[56] References Cited

U.S. PATENT DOCUMENTS

| | | | |
|---|---|---|---|
| Re. 31,414 | 10/1983 | Dey et al. | 429/101 |
| 3,873,369 | 3/1975 | Kamenski | 429/194 |
| 3,877,983 | 4/1975 | Hovsepian | 429/194 |
| 3,877,988 | 4/1975 | Dey et al. | 429/194 |
| 3,884,723 | 5/1975 | Wuttke | 429/162 |
| 3,904,432 | 9/1975 | Dey et al. | 429/194 |
| 3,930,885 | 1/1976 | Dey | 429/116 |
| 3,945,848 | 3/1976 | Dey et al. | 429/198 |
| 3,981,748 | 9/1976 | Margalit | 429/164 |
| 4,016,338 | 4/1977 | Lauck | 429/149 |
| 4,028,138 | 6/1977 | Dey | 29/623.2 |
| 4,053,692 | 10/1977 | Dey | 429/171 |
| 4,057,679 | 11/1977 | Dey | 429/194 |
| 4,084,045 | 4/1978 | Kegelman | 429/194 |
| 4,091,188 | 5/1978 | Dey | 429/174 |
| 4,113,929 | 9/1978 | Margalit | 429/194 |
| 4,139,680 | 2/1979 | Schlaikjer | 429/50 |
| 4,158,722 | 6/1979 | Lauck et al. | 429/194 |
| 4,168,351 | 9/1979 | Taylor | 429/48 |
| 4,177,329 | 12/1979 | Dey et al. | 429/101 |
| 4,184,017 | 1/1980 | Kelsey et al. | 429/197 |
| 4,238,552 | 12/1980 | Dey et al. | 429/101 |
| 4,252,876 | 2/1981 | Koch | 429/197 |
| 4,423,124 | 12/1983 | Dey | 429/194 |
| 4,430,399 | 2/1984 | Schoolcraft | 429/218 |
| 4,470,939 | 9/1984 | Schoolcraft | 264/104 |
| 4,556,613 | 12/1985 | Taylor et al. | 429/101 |
| 4,752,541 | 6/1988 | Faulkner et al. | 429/101 |
| 4,874,680 | 10/1989 | Koshiba et al. | 429/197 |
| 4,983,476 | 1/1991 | Slane et al. | 429/197 |
| 5,079,109 | 1/1992 | Takami et al. | 429/197 |
| 5,162,178 | 11/1992 | Ohsawa et al. | 429/218 |
| 5,180,574 | 1/1993 | Von Sacken | 423/594 |
| 5,294,498 | 3/1994 | Omaru et al. | 429/122 |
| 5,296,318 | 3/1994 | Gozdz et al. | 429/192 |
| 5,310,553 | 5/1994 | Simon et al. | 429/212 |
| 5,358,805 | 10/1994 | Fujimoto et al. | 429/218 |
| 5,370,949 | 12/1994 | Davidson et al. | 429/224 |
| 5,378,560 | 1/1995 | Tomiyama | 429/217 |
| 5,385,794 | 1/1995 | Yokoyama et al. | 429/194 |
| 5,395,711 | 3/1995 | Tahara et al. | 429/197 |
| 5,401,599 | 3/1995 | Tahara et al. | 429/218 |

*Primary Examiner*—Anthony Skapars
*Attorney, Agent, or Firm*—Thomas F. Woods; Harold R. Patton

[57] ABSTRACT

A lithium/silver vanadium oxide cell is disclosed that includes an improved electrolyte composition having the solvents propylene carbonate and 1,2-dimethoxyethane, and an additional third solvent that reduces the solubility of the composition of the silver vanadium cathode material. Preferably, the third solvent is a dialkyl carbonate such as dimethyl carbonate, diethyl carbonate or ethylmethyl carbonate. The improved electrolyte composition reduces the build up of resistance in the cell during cell discharge, and can affect the cell's performance in implantable cardiac defibrillator applications.

9 Claims, 4 Drawing Sheets

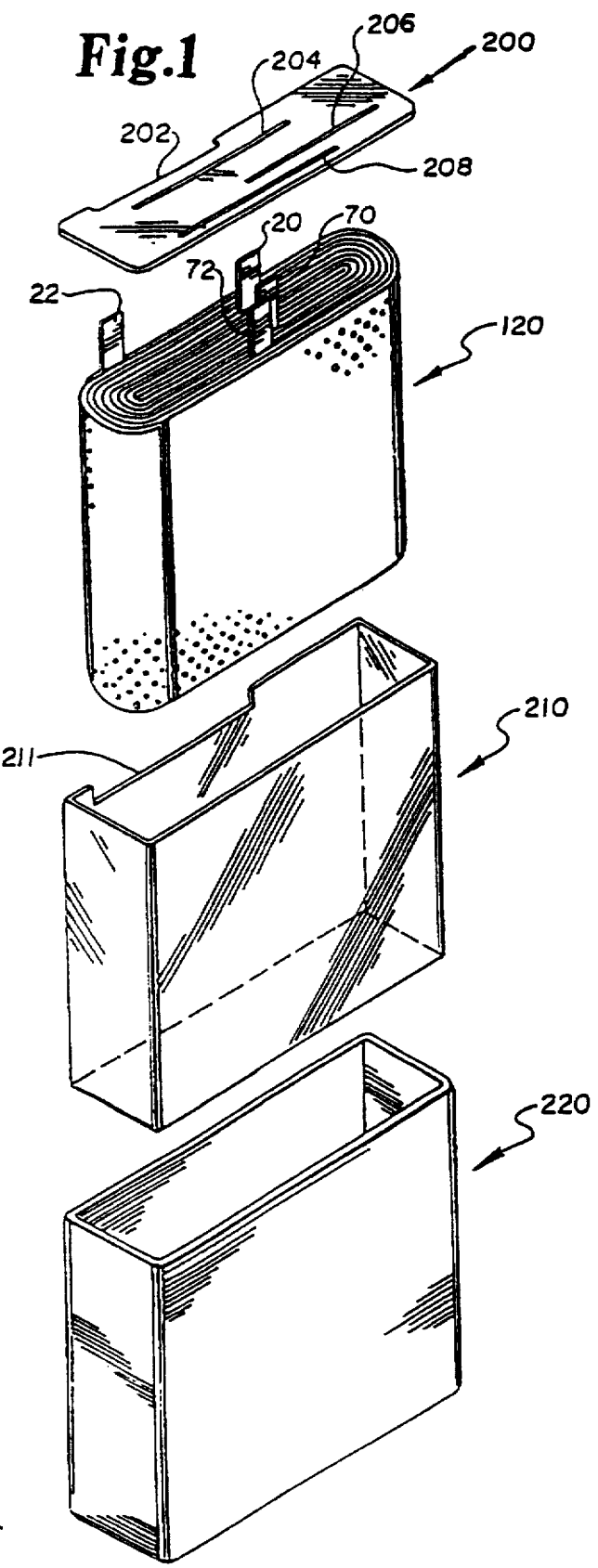

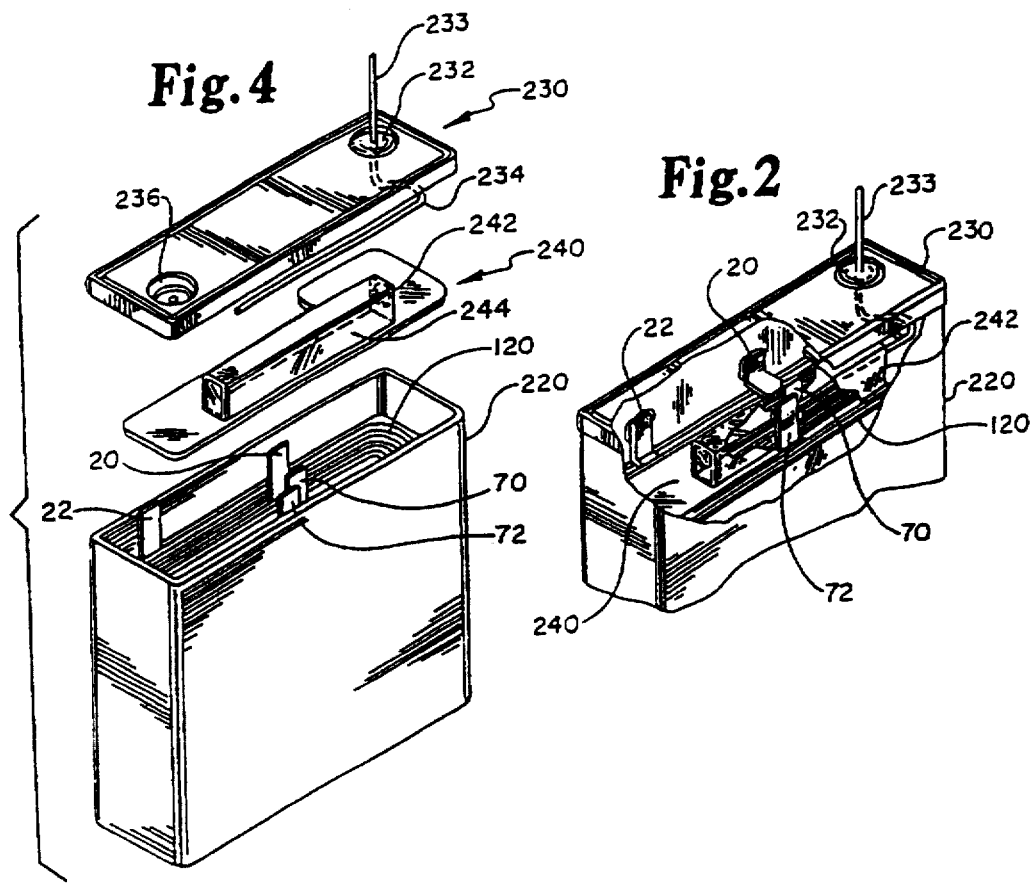
Fig. 4
Fig. 2
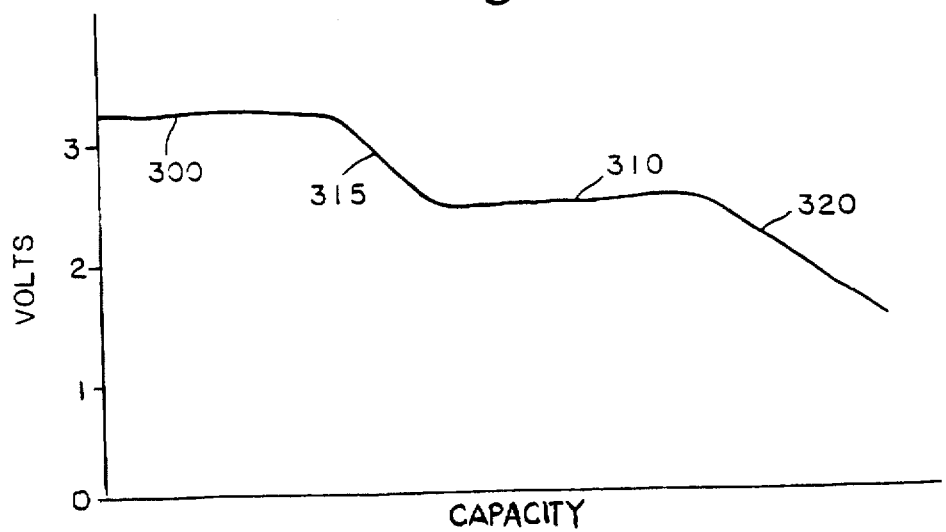
Fig. 5

ELECTROLYTE FOR LI/SVO BATTERIES

BACKGROUND OF THE INVENTION

This invention relates to electrochemical cells having a lithium anode and more particularly to a primary lithium electrochemical cell adapted for high reliability and high rates of current discharge.

Implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Shocks as large as 30–35 joules may be needed. Shocks are delivered from capacitors capable of providing that amount of energy to the patient in a fraction of a second. To provide timely therapy to the patient after the detection of ventricular fibrillation, it is necessary to charge the capacitors with the required amount of energy in only a few seconds. Thus, the power source must have a high rate capability to provide the necessary charge to the capacitors, possess low self-discharge to have a useful life of many months, and must be highly reliable to provide an urgently needed therapy whenever necessary. In addition, since cardiac defibrillators are implanted, the battery must be able to supply energy from a minimum packaged volume.

One battery suitable for defibrillator use includes silver vanadium oxide as a cathode material as disclosed in U.S. Pat. Nos. 4,310,609 or 4,391,729 issued to Liang et al or U.S. Pat. No. 5,221,453 issued to Crespi. The cathode materials described in the foregoing Liang and Crespi patents can find application in the batteries or cells disclosed in U.S. Pat. Nos. 5,458,997; 5,312,458; 5,298,349; 5,250,373; 5,147,737; 5,114,811; 5,114,810; 4,964,877; and 4,830,840. All the foregoing patents are hereby incorporated by reference herein in their respective entireties.

As disclosed in some of the foregoing patents, the anode material of the battery is lithium and the reactive cathode material is silver vanadium oxide. The electrolyte for a lithium battery or cell is a liquid organic type which comprises a lithium salt in combination with an organic solvent.

Organic solvents known for use in lithium cells can be, for example, 3-methyl-2-oxazolidone, sulfolane, tetrahydrofuran, methyl-substituted tetrahydrofuran, 1,3-dioxolane, propylene carbonate (PC), ethylene carbonate, gamma-butyrolactone, ethylene glycol sulfite, dimethylsulfite, dimethyl sulfoxide or mixtures thereof and also, for example, low viscosity cosolvents such as tetrahydrofuran (THF), methyl-substituted tetrahydrofuran(Met-THF), dioxolane (DIOX), dimethoxyethane (DME), dimethyl isoxazole (DMI), diethyl carbonate(DEC), ethylene glycol sulfite (EGS), dioxane, dimethyl sulfite (DMS) or the like. The ionizing solute for lithium cells can be a simple or double salt or mixtures thereof, as for example, $LiCF_3SO_3$, $LiBF_4$, $LiAsF_6$, $LiPF_6$ and $LiClO_4$ which produce an ionically conductive solution when dissolved in one or more solvents. An organic solvent composition commonly used for lithium/silver vanadium oxide cells has been a mixture of propylene carbonate and 1,2-dimethoxyethane in a 50/50 ratio.

The selection of the particular solvent components and acceptable ratios of the solvent components can prove to be a difficult task even if each component is individually well known. Typically a solvent component may be selected for its dielectric constant, for its capabilities as a solvent for the particular solute material, for its viscosity or for other properties which may be unique to a particular cell. For example, since 1,2-dimethoxyethane has a low viscosity and a low dielectric constant, it is commonly mixed with another polar aprotic solvent having a higher dielectric constant (e.g.,propylene carbonate, ethylene carbonate, or gamma-butyrolactone) for use in practical lithium cells and batteries. Such a solvent mixture possesses better properties for the ionization of lithium salts and wetting of the electrode and separator surfaces than either of the component solvents alone.

Electrolytes have also been indicated to be suitable for use in lithium cells with three solvent components. For example, U.S. Pat. No. 4,129,691 issued to Broussely, and hereby incorporated by reference herein in its entirety, discloses an electrolyte for use in lithium/cupric oxide or lithium/ferrous sulfide primary cells which is made from a mixture of three organic solvents and an alkaline solute. The first solvent is chosen to have a dielectric constant equal to or greater than 35 (e.g. propylene carbonate), the second solvent is a linear polyether with its ether functional groups in the gamma position (e.g. 1,2-dimethoxyethane) and the third solvent has a high solvation power for dissolving large quantities of the alkaline salt (e.g. 1,3-dioxolane).

In lithium/silver vanadium oxide cells, it has been noted that the cell tends to increase in resistance in a roughly time-dependent manner after the battery is discharged to a second voltage plateau. This means that on long-term discharge, these cells can develop high resistance that impairs their ability to charge the capacitors of a defibrillator in a timely manner and therefore renders much of the capacity of the cell unavailable for long term use in an implantable defibrillator. Further, the end of service determination in these cells is complicated by the variable nature of the resistance buildup. In an experiment which substituted ethylene carbonate for propylene carbonate, it was found that the irreversible resistance was much worse with the ethylene carbonate. This is contrary to expectation since ethylene carbonate has a higher dielectric constant than propylene carbonate so that the solvent with ethylene carbonate should have reduced resistance for the cell. Accordingly, it is believed that the solubility of the silver vanadium oxide cathode material in the electrolyte solvent contributes to the build-up of resistance over time.

It is therefore an object of the present invention to provide a high current rate capability lithium/silver vanadium oxide battery having a reduced resistance at the second voltage plateau.

It is also an object of the present invention to provide an electrolyte for a lithium/silver vanadium oxide battery which provides improved discharge characteristics for the battery.

SUMMARY OF THE INVENTION

These and other objects are accomplished by the electrochemical cell and electrode assembly of the present invention. We have discovered a lithium/silver vanadium oxide cell which includes an improved electrolyte composition which includes the solvents propylene carbonate and 1,2-dimethoxyethane and a third solvent which reduces solubility of the composition for the silver vanadium cathode material. Preferably, the third solvent is a dialkyl carbonate such as dimethyl carbonate, diethyl carbonate, or ethylmethyl carbonate. Most preferably, the electrolyte composition includes about 20–30 percent by volume of propylene carbonate, 20–30 percent by volume of dimethyl carbonate and 40–60 percent by volume of 1,2-dimethoxyethane.

Some preferred solutes for the electrolyte of the present invention include lithium hexafluoroarsenate (LiAsF6), lithium hexafluorophosphate (LiPF$_6$), lithium imide (Li(CF$_3$SO$_2$)$_2$N), lithium tris(trifluoromethane sulfonate) carbide ((Li(CF$_3$SO$_2$)$_3$C), lithium tetrafluoroborate (LiBF$_4$), lithium triflate (LiCF$_3$SO$_3$), and lithium perchlorate (LiClO$_4$).

BRIEF DESCRIPTION OF THE DRAWINGS

FIG. 1 is an exploded perspective view showing the insertion of an electrode assembly into a battery case together with insulator materials.

FIG. 2 is a partial cut-away perspective view of a completed battery showing the connections of the tabs of the electrode with the case elements.

FIG. 4 is an exploded perspective view showing the application of the insulator and case top to the case and electrode assembly of FIG. 1.

FIG. 5 is a graph showing a discharge curve for a lithium/silver vanadium oxide battery with a second voltage plateau.

DETAILED DESCRIPTION OF THE INVENTION

Figure 3:
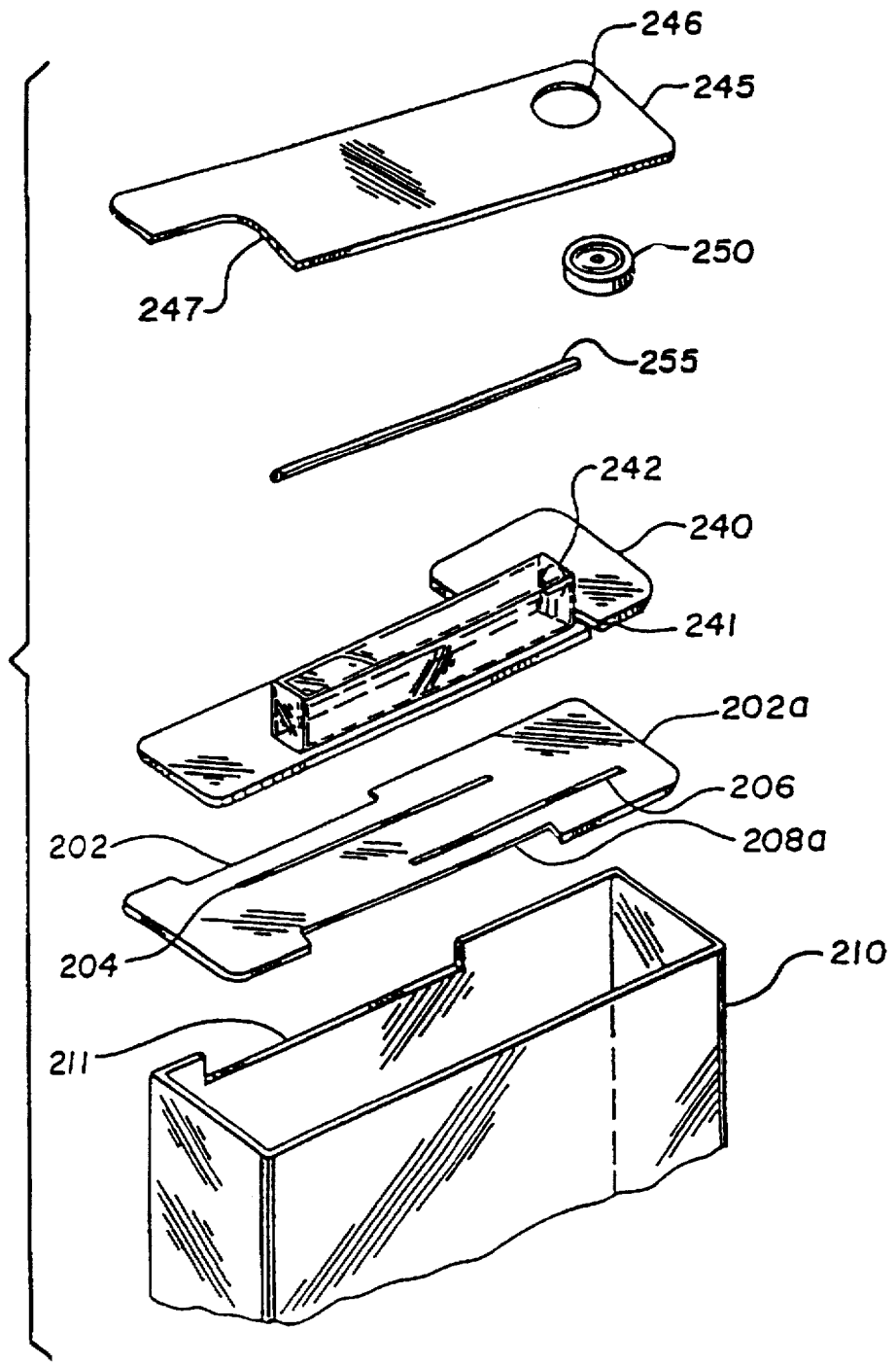
FIG. 3 is a partial cut-away perspective view of the isolation components for a battery.

The present invention is directed to a lithium/silver vanadium oxide cell which includes an improved electrolyte composition which includes the solvents propylene carbonate and 1,2-dimethoxyethane and a third solvent which reduces solubility of the composition for the silver vanadium cathode material.

Although a variety of battery configurations and constructions are possible for lithium/silver vanadium oxide batteries, a coiled or wrapped configuration will be discussed herein as an exemplar of a conventional lithium/silver vanadium oxide battery for use with the invention. The invention is of course applicable to any configuration and construction.

Figure shows an exemplary battery construction. It can be seen that a coiled electrode assembly comprised of elongated anode and cathode subassemblies including anode material (lithium) or cathode material (silver vanadium oxide—SVO which may also include PTFE binder, carbon black and graphite) pressed onto a metal current collector (Ni, Ti, etc.) and enveloped with a separator of microporous material such as polyethylene, polypropylene or the like are overlaid with respect to each other and coiled up. Connector tabs may be included within the electrode assembly for making electrical connection thereto.

Assembly of the electrode assembly 120 into a battery is shown in FIGS. 1–4. In FIG. 1, a coil insulator 200 is placed onto the electrode assembly 120. The coil insulator includes a notch 202 to accommodate anode connector tab 22 and slits 204, 206 208 to accommodate anode connector tab 20, and cathode connector tabs 70, 72 respectively. The electrode assembly 120 is also inserted into an insulative case liner 210. The case liner 210 preferably extends at its top edge above the edge of the electrode assembly 120 in order to provide an overlap with other insulative elements. If so, it may include a notch 211 on one side in order to allow the easy connection of the anode connector tabs 20, 22 to the case 220. The coil insulator 200 and case liner 210 are preferably made from a polyolefin polymer or a fluoropolymer such as PTFE or PETFE. The electrode assembly 120 and case liner 210 are then inserted into a prismatic case 220, preferably made of stainless steel or titanium.

In FIG. 4, a case cover 230 and a pin insulator 240 are shown along with the electrode assembly 120 and prismatic case 220. The case cover 230 has a glassed in feedthrough 232 and feedthrough pin 233 extending through an aperture in the case cover 230 that has a bend 234 which is intended to place the feedthrough 232 in alignment with the cathode connector tabs 70, 72. The case cover 230 also has a fill port 236. The case cover 230 is made from stainless steel and the feedthrough pin 233 is preferably formed of niobium, tantalum or molybdenum. The pin insulator 240 has an aperture 242 leading into a raised portion 244 which receives the feedthrough pin 233 and insulates the feedthrough pin 233 from contact with the case cover 230.

In combination with one side of the coil insulator 200, which is immediately below the pin insulator 240, the raised portion forms a chamber which isolates the cathode connections. Additional insulation in the form of tubing or a coating (not shown) may also be included on the feedthrough pin 233 and feedthrough 232 at locations which will not be welded to further insulate the feedthrough pin 233 and feedthrough 232 and also an additional cover insulator (not shown) could be applied to the underside of the case cover 230 to provide additional insulation for the case cover 230. The feedthrough pin 233 is welded to the cathode connector tabs 70, 72 (as shown in FIG. 2) and the anode connector tabs 20, 22 are bent into an "L" shape and are welded to the side of the case 220 thereby making the metal case 220 one terminal or contact for the battery (i.e. a case negative design). The feedthrough pin 233 is then inserted through a split (not shown) in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case.

FIG. 3 shows the isolation components of the battery in greater detail. A cover insulator 245 is adapted to fit under the case cover 230 with an aperture 246 to accommodate the feedthrough 232 and feedthrough pin 233 and a cut-away portion 247 to accommodate the fill port 236. The cover insulator 245 is applied to the underside of the case cover 230. A feedthrough insulator 250 then slides over the feedthrough pin 233 and over the feedthrough 232 into contact with the cover insulator 245. Once the feedthrough insulator 250 is in place, a tubular insulator 255 is slipped over the feedthrough pin 233 until it contacts the feedthrough insulator 250. The feedthrough pin 233 is then bent into its desired configuration for connection with cathode connector tabs 70, 72 as shown in FIG. 4.

The pin insulator 240 is shown with a split 241 which extends from the edge of the pin insulator 240 to the aperture 242. Again, the pin insulator 240 has an aperture 242 leading into a raised portion 244 or recess which receives the feedthrough pin 233 and the tubular insulator 255 over the feedthrough pin and insulates the feedthrough pin 233 from contact with the case cover 230 at the point where the feedthrough pin is welded to the cathode connector tabs 70, 72. The split 241 allows the pin insulator 240 to be placed on the feedthrough pin 233 after the feedthrough pin has been welded to the cathode tabs 70, 72. The tubular insulator 255 therefore extends through the aperture 242, thereby preventing any discontinuity in the isolation of the cathode connector tabs 70, 72 and feedthrough pin 233 from elements at anode potential.

A coil insulator 202a is shown with a notch 202 to accommodate anode connector tab 22 and slits 204, 206 to accommodate anode connector tab 20, and cathode connector tab 70 respectively. A notch 208a is also provided to accommodate cathode connector tab 72 in place of the slit 208 shown in FIG. 1. The electrode assembly 120 is also inserted into an insulative case liner 210. All of the case isolation components including the cover insulator 245, the feedthrough insulator 250, the tubular insulator 255, the pin insulator 240, the coil insulator 202a and the case liner 210 are molded or extruded self-supporting polymeric parts preferably made from a polyolefin polymer or a fluoropolymer such as PTFE or PETFE.

The result of this insulator configuration is that the cathode connections are thoroughly isolated from the portions of the battery at anode potential and that the feedthrough connection is thoroughly isolated from stray particles of material from the cathode and from lithium particles that may form during discharge of the battery.

An appropriate electrolyte solution is introduced through the fill port 236 and the fill port 236 is then sealed. The electrolyte solution can be an alkali metal salt in an organic solvent such as a lithium salt (i.e., 1.0M $LiClO_4$ or $LiAsF_6$) in the solvent composition of the present invention. A mixture of propylene carbonate and dimethoxyethane together with a third solvent component which reduces solubility of the composition for the silver vanadium cathode material is used. The sealing process (not shown) may include, for example, making a first seal by pressing a plug into the aperture of the fill port 236 and making a second seal by welding a cap or disc over the fill port 236. Material utilized for leak checking hermetic seals may be included between the first and second seals.

As already indicated, such batteries are generally known in the art and used to power defibrillators. As shown in FIG. 5, the open-circuit voltage of such lithium/silver vanadium oxide cells have two voltage plateaus, a first voltage plateau 300 at about 3.2 v and a second voltage plateau 310 at about 2.6 v, with two sloping regions 315, 320. The cells of FIG. 5 are balanced with sufficient lithium and electrolyte to discharge the cathode to completion. With a silver vanadium oxide formula of $Ag_2V_4O_{11}$, it has been calculated that about 6.67 equivalents of lithium are required to completely discharge one equivalent of silver vanadium oxide.

Thus, in one embodiment of the present invention, an electrochemical cell has a first quantity of lithium anode material and a second quantity of silver vanadium oxide cathode material, and the cell produces a voltage discharge curve having a second voltage plateau at about 2.6 volts. The cell of such an embodiment of the present invention is further characterized in having an electrolyte composition in contact with at least a portion of the first quantity of lithium anode material and in contact with at least a portion of the second quantity of silver vanadium oxide cathode material, and the electrolyte composition includes a solute and a solvent mixture of propylene carbonate and 1,2-dimethoxyethane, the solvent mixture having a dialkyl carbonate as a third solvent.

In the present invention, the improved electrolyte composition includes the solvents propylene carbonate and 1,2-dimethoxyethane together with a third solvent which reduces solubility of the composition for the silver vanadium cathode material. That solvent must be a polar, aprotic solvent which is homogeneously miscible with the propylene carbonate and 1,2-dimethoxyethane components, and which is nonreactive with the battery components. Preferably, the third solvent is a dialkyl carbonate such as dimethyl carbonate, diethyl carbonate or ethylmethyl carbonate.

Longer chain alkyl groups may also find application as or in the third solvent. For example, longer chain alkyl groups formed using propyl groups ($C_3H_7$ groups) or butyl groups ($C_4H_9$), or combinations thereof, may find application as the third solvent, or as components thereof. Some cyclic, aromatic or aliphatic carbonates may also find application as or in the third solvent such as dicyclopentylcarbonates.

Most preferably, the electrolyte composition includes about 20–30 percent by volume of propylene carbonate, 20–30 percent by volume of dimethyl carbonate and 40–60 percent by volume of 1,2-dimethoxyethane. Also, most preferably, the concentration of 1,2-dimethoxyethane should be less than 50% in order to minimize gas formation since high levels of 1,2-dimethoxyethane in the presence of residual moisture can promote the formation of methane which is detrimental to battery performance.

The solute is preferably lithium hexafluoroarsenate (LiAsF6), lithium hexafluorophosphate ($LiPF_6$), lithium imide ($Li(CF_3SO_2)_2N$), lithium tris(trifluoromethane sulfonate) carbide (($Li(CF_3SO_2)_3C$), lithium tetrafluoroborate ($LiBF_4$), lithium triflate ($LiCF_3SO_3$), or lithium perchlorate ($LiClO_4$). Lithium hexafluoroarsenate is the most preferred solute for the electrolyte at a one molar concentration.

Table 1 below shows experimental resistivity data obtained with a conventional, prior art electrolyte and electrolytes of the present invention. The conventional, prior art electrolyte comprised one molar lithium hexafluoroarsenate in 50/50 volume percent mixture of propylene carbonate and 1,2-dimethoxyethane. The electrolytes of the present invention comprised varying amounts of propylene carbonate (PC), dimethyl carbonate (DMC), diethyl carbonate (DEC), 1,2-dimethoxyethane (DSE), varying concentrations of lithium hexafluoroarsenate, as set forth in Table 1 below. Electrolyte resistivities were measured at room temperature using an conventional conductivity probe connected to a Hewlett Packard 4192A Impedance Analyzer.

TABLE 1

| Measured Electrolyte Resistivities | |
| --- | --- |
| Electrolyte Composition | Resistivity (Ohm-centimeters) |
| conventional electrolyte | 82.2 |
| 1 M $LiAsF_6$ in 25% PC, 25% DMC, and 50% DME | 65.1 |
| 1 M $LiAsF_6$ in 40% PC, 20% DMC, and 40% DME | 69.1 |
| 1 M $LiAsF_6$ in 20% PC, 40% DMC, and 40% DME | 63.4 |
| 1 M $LiAsF_6$ in 20% PC, 20% DMC, and 60% DME | 61.5 |
| 0.8 M $LiAsF_6$ in 40% PC, 20% DMC, and 40% DME | 69.5 |
| 0.8 M $LiAsF_6$ in 20% PC, 40% DMC, and 40% DME | 65.6 |
| 0.8 M $LiAsF_6$ in 20% PC, 20% DMC, and 60% DME | 64.1 |
| 1.2 M $LiAsF_6$ in 40% PC, 20% DMC, and 40% DME | 69.2 |
| 1.2 M $LiAsF_6$ in 20% PC, 40% DMC, and 40% DME | 63.6 |
| 1.2 M $LiAsF_6$ in 20% PC, 20% DMC, and 60% DME | 63.3 |

Table 1 shows that the electrolytes of the present invention provide enhanced conductivity in respect of a known, prior art electrolyte. Enhanced conductivity in a battery generally results in improved rate capability because ionic transport in the electrolyte is quicker and more efficient.

Figure 6:
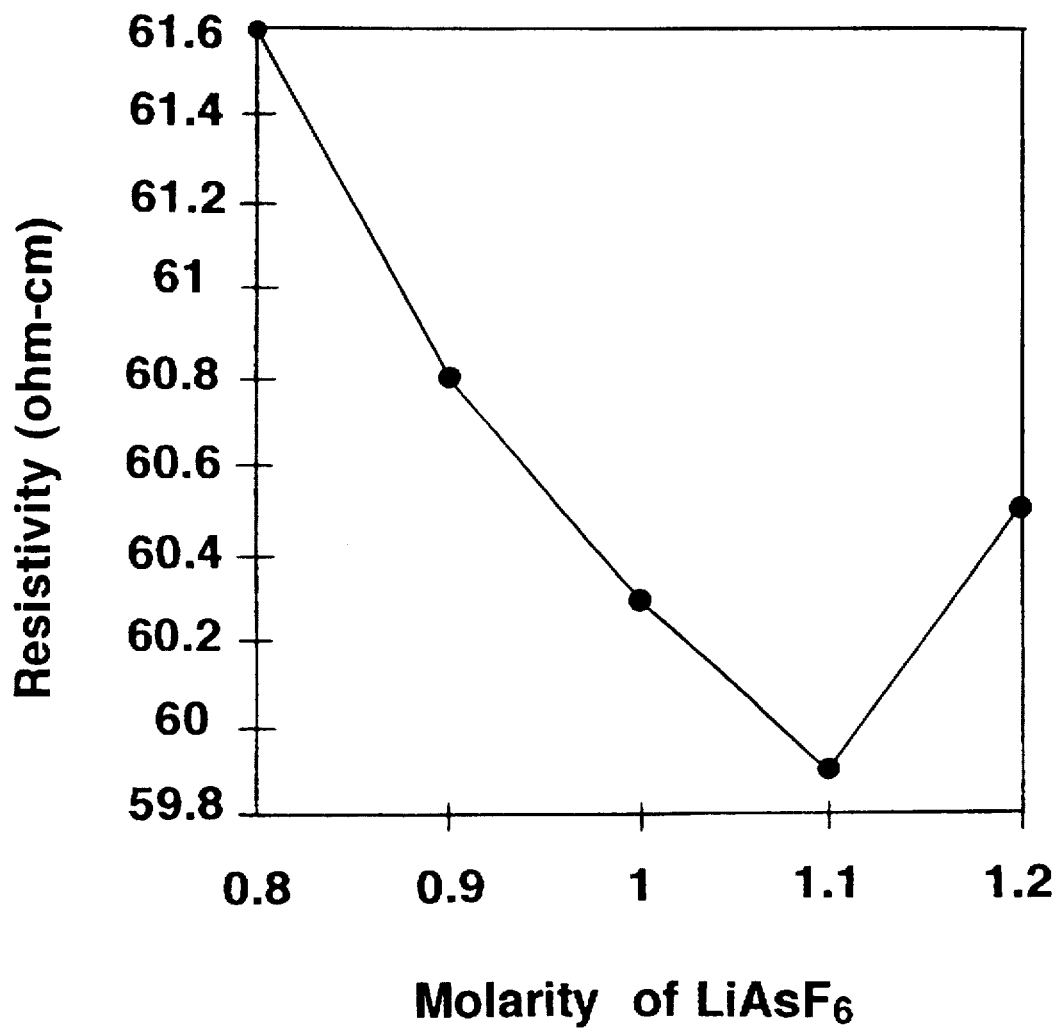
FIG. 6 shows a graph of hexafluoroarsenate molarity versus resistivity for a 20% EC (ethylene carbonate), 20% DMC (dimethyl carbonate), and 60% DME (1,2-dimethoxyethane) electrolyte solution of the present invention.

FIG. 6 shows a graph of hexafluoroarsenate molarity versus resistivity for a 20% EC, 20% DMC, and 60% DME electrolyte solution of the present invention. Electrolyte resistivities in this experiment were measured at room temperature using an conventional conductivity probe connected to a Hewlett Packard 4192A Impedance Analyzer. A resistivity minimum is seen to occur at about 1.1M $LiAsF_6$, indicating that advantageous results can be obtained in a primary lithium battery containing an electrolyte of the present invention.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the scope of the present invention.

We claim:

1. An electrochemical cell, comprising:
   (a) an anode comprising lithium;
   (b) a cathode comprising a silver vanadium oxide material;
   (c) an electrolyte comprising a solute and a solvent mixture of propylene carbonate and 1,2-dimethoxyethane, the solvent mixture further comprising a third solvent that is a dialkyl carbonate selected from the group consisting of dimethyl carbonate, diethyl carbonate and ethylmethyl carbonate, the third solvent being homogeneously miscible with the solvent mixture of propylene carbonate and 1,2-dimethoxyethane, the third solvent reducing the solubility of the silver vanadium oxide material.

2. An electrochemical cell as in claim 1 wherein the solvent mixture comprises about 20–30 percent by volume of propylene carbonate, 20–30 percent by volume of dimethyl carbonate and 40–60 percent by volume of 1,2-dimethoxyethane.

3. An electrochemical cell as in claim 1, wherein the solute is selected from the group consisting of lithium hexafluoroarsenate (LiAsF6), lithium hexafluorophosphate ($LiPF_6$), lithium imide ($Li(CF_3SO_2)_2N$), lithium tris (trifluoromethane sulfonate) carbide (($Li(CF_3SO_2)_3C$), lithium tetrafluoroborate ($LiBF_4$), lithium triflate ($LiCF_3SO_3$), and lithium perchlorate ($LiClO_4$).

4. In an electrochemical cell having a first quantity of lithium anode material and a second quantity of silver vanadium oxide cathode material, the cell producing a voltage discharge curve having a second voltage plateau at about 2.6 volts and having an electrolyte composition in contact with at least a portion of the first quantity of lithium anode material and in contact with at least a portion of the second quantity of silver vanadium oxide cathode material, the electrolyte composition including a solute and a solvent mixture of propylene carbonate and 1,2-dimethoxyethane, the solvent mixture having a dialkyl carbonate as a third solvent.

5. An electrochemical cell as in claim 4, wherein the dialkyl carbonate is selected from the group consisting of dimethyl carbonate, diethyl carbonate, and ethylmethyl carbonate.

6. An electrochemical cell as in claim 5, wherein the solvent mixture comprises about 20–30 percent by volume of propylene carbonate, 20–30 percent by volume of dimethyl carbonate and 40–60 percent by volume of 1,2-dimethoxyethane.

7. An electrochemical cell as in claim 4, wherein the solute is selected from the group consisting of lithium hexafluoroarsenate (LiAsF6), lithium hexafluorophosphate ($LiPF_6$), lithium imide ($Li(CF_3SO_2)_2N$), lithium tris (trifluoromethane sulfonate) carbide (($Li(CF_3SO_2)_3C$), lithium tetrafluoroborate ($LiBF_4$), lithium triflate ($LiCF_3SO_3$), and lithium perchlorate ($LiClO_4$).

8. An electrochemical cell as in claim 5, wherein the solute is selected from the group consisting of lithium hexafluoroarsenate (LiAsF6), lithium hexafluorophosphate ($LiPF_6$), lithium imide ($Li(CF_3SO_2)_2N$), lithium tris (trifluoromethane sulfonate) carbide (($Li(CF_3SO_2)_3C$), lithium tetrafluoroborate ($LiBF_4$), lithium triflate ($LiCF_3SO_3$), and lithium perchlorate ($LiClO_4$).

9. An electrochemical cell as in claim 4, wherein the solute is selected from the group consisting of lithium hexafluoroarsenate (LiAsF6), lithium hexafluorophosphate ($LiPF_6$), lithium imide ($Li(CF_3SO_2)_2N$), lithium tris (trifluoromethane sulfonate) carbide (($Li(CF_3SO_2)_3C$), lithium tetrafluoroborate ($LiBF_4$), lithium triflate ($LiCF_3SO_3$), and lithium perchlorate ($LiClO_4$).

* * * * *